United States Patent Office 3,793,402
Patented Feb. 19, 1974

3,793,402
LOW HAZE IMPACT RESISTANT COMPOSITIONS CONTAINING A MULTI-STAGE, SEQUENTIALLY PRODUCED POLYMER
Frederick H. Owens, 68 Hewlet Lane,
Willingboro, N.J. 08046
No Drawing. Continuation-in-part of abandoned application Ser. No. 27,996, Apr. 13, 1970. This application Nov. 5, 1971, Ser. No. 196,194
Int. Cl. C08f 15/18, 19/08
U.S. Cl. 260—876 R         23 Claims

ABSTRACT OF THE DISCLOSURE

An impact resistant thermoformable composition having improved stress whitening behavior comprising a blend of a thermoplastic polymer and a multi-stage, sequentially produced polymer characterized by: (A) a non-elastomeric, hard first stage; (B) an intermediate elastomeric stage; and (C) a final, relatively hard stage.

---

This application is a continuation-in-part of our copending application, Owens, Ser. No. 27,996, filed Apr. 13, 1970 and now abandoned, entitled "Composite Interpolymer and Low Haze Impact Resistant Thermoplastic Compositions Thereof."

This invention relates to rigid thermoplastic polymer compositions. These compositions, as a class of materials, are well known and are used for their advantageous balance of properties. These thermoplastic materials, being rigid, are susceptible to breakage during manufacturing, processing, shipping and use. It is known that elastomeric materials may be added to these rigid thermoplastic compositions to provide improved resistance to sharp, high velocity impact. These elastomers generally present a discontinuous phase in the thermoplastic and although they substantially improve impact resistance, they often detrimentally affect optical properties such as clarity and color. Even where elastomer particle size is controlled and/or the refractive index of the elastomer phase and the rigid thermoplastic phase are "matched," a significant haze level may persist in the final products. This haze effect is increased on exposure to moisture or low or high temperatures and by the influence of stress (stress whitening). Even materials which appear optically clear may develop haze when exposed to moisture, and/or low or high temperatures or when subjected to stress. The hazing appears as a whiteness, which upon examination is found to occur through the entire body of the material, not merely on its surface. The whiteness may increase with continued exposure to moisture, high temperature or to stress until the thermoplastic becomes opaque. Eventually crazing may result and the material may fail. In the case of materials where particle size and/or refractive index are not controlled, i.e. translucent or opaque materials, the color of the modified thermoplastic may change on exposure to moisture or low or high temperatures, or on being subjected to stress. See Schmitt, U.S. Pat. 3,445,544, issued May 20, 1969.

The present invention relates to (A) transparent and translucent impact resistant thermoformable compositions having improved resistance to haze and particularly to permanent stress whitening and temperature hazing which because of these improved properties, are particularly useful as glazing materials and (B) translucent and opaque, impact resistant thermoformable compositions having improved resistance to permanent stress whitening and temperature-induced color changes. The present invention relates to compositions which may be molded, extruded, cast, etc. into thermoplastic compositions in the form of sheets, articles, etc.

The thermoplastic composition comprises a blend of about 10 to 96 weight percent of a rigid thermoplastic polymer of a monomer selected from the group consisting of alkyl methacrylate wherein the alkyl group has 1 to 4 carbon atoms, styrene, substituted styrene, acrylonitrile, methacrylonitrile and combinations thereof or a polymer of greater than 50 weight percent of at least one of these monomers and at least one other copolymerizable monoethylenically unsaturated monomer, and about 90 to 4 weight percent of a multi-stage, sequentially-produced polymer characterized by (A) a non-elastomeric, relatively hard first stage having a glass transition temperature of greater than 25° C., polymerized from a monomer mixture of 80 to 100 weight percent of the monomers described above for the rigid thermoplastic polymer, 0 to 10 weight percent of a copolymerizable polyfunctional crosslinking monomer, and 0 to 10 weight percent of a copolymerizable graftlinking monomer which may be an allyl, methallyl or crotyl ester of an $\alpha,\beta$-unsaturated carboxylic acid or diacid; (B) an intermediate elastomeric stage polymerized in the presence of a product containing the first stage from a monomer mixture comprising 50 to 99.9 weight percent of butadiene, substituted butadiene, an alkyl acrylate or mixtures thereof wherein the alkyl group of the alkyl acrylate contains 1 to 8 carbon atoms, 0 to 49.9 weight percent of a copolymerizable monoethylenically unsaturated monomer, 0 to 5.0 weight percent of a copolymerizable polyfunctional crosslinking monomer and 0.05 to 5.0 weight percent of a copolymerizable graftlinking monomer which may be an allyl, methallyl or crotyl ester of an $\alpha,\beta$-unsaturated carboxylic acid or diacid, said elastomeric stage further characterized in that it would exhibit a glass transition temperature of 25° C. or less if the monomers were polymerized in the absence of the product containing the first stage; and (C) a final, relatively hard stage polymerized in the presence of a product containing the first and intermediate stages from a monomer mixture of the monomers described above for the rigid thermoplastic polymer, the final stage further characterized in that it would exhibit a glass transition temperature of greater than 25° C. if the monomers were polymerized in the absence of the product containing the first and intermediate stages, the graft linking monomer having two or more addition polymerizable unsaturated reactive groups which participate in the polymerization reaction at substantially different rates and the cross-linking monomer having a plurality of addition polymerizable unsaturated groups all of which participate in the polymerization reaction at about the same rate as one another. Preferably the multi-stage polymer is a three stage composition wherein the stages are present in ranges of 10 to 40 percent by weight, preferably 20 to 40 percent, of the first stage (A), 20 to 60 percent, preferably 30 to 50, of the second intermediate stage (B), and 10 to 70 percent, preferably 20 to 50, of the final stage (C), all percentages based on the total weight of the three-stage polymer.

The transparent and translucent composition of the present invention containing elastomeric stages polymerized from monomer mixtures containing greater than 70% of an alkyl acrylate are excellent glazing materials since they are characterized by a modulus of elasticity of at least 170,000 p.s.i., impact resistance, good white light transmission, resistance to permanent hazing due to moisture, stress or temperature change.

Myers et al., U.S. patent application Ser. No. 56,007, filed July 17, 1970, now abandoned, and a later continuation-in-part of this application filed Sept. 29, 1971, Ser. No. 184,913, disclose and claim three stage, sequentially produced polymers that are modifiers for vinyl halide polymers. The present application is directed to impact resistant, thermoformable compositions comprising a blend of a rigid thermoplastic that is not a vinyl halide polymer and the multi-stage, sequentially produced polymer described in this specification.

Griffin, U.S. Pat. 3,450,796, June 17, 1969, discloses polymers having a rigid thermoplastic first stage onto which is polymerized an elastomeric stage, both stages being produced in emulsion. A rigid thermoplastic polymer is then formed by suspension polymerization in the presence of the emulsion-produced, two-stage polymer. In the practice of the present invention, it has been found that both compositions produced by mechanically blending a sequentially-produced polymer having at least 10 weight percent rigid final stage with a thermoplastic polymer and compositions produced by forming a thermoplastic polymer by polymerizing monomers in the presence of the sequentially-produced polymer having at least 10 weight percent rigid final stage, exhibit improved impact strength and resistance to permanent stress whitening as compared to compositions produced by forming the thermoplastic polymer by polymerizing monomers in a suspension of a two-stage, sequentially produced polymer having a final elastomeric stage.

The compositions of the present invention are improvements to polymers having a "soft" first stage, disclosed and claimed in Owens, U.S. patent application Ser. No. 27,996, filed Apr. 13, 1970. The polymers disclosed and claimed by Owens are rigid thermoplastics which retain their color and/or transparency and their impact resistance upon exposure to water, either by immersion or by exposure to high levels of humidity, and upon weathering; however, these materials display an increase in haze level at low or high temperatures and on being subjected to stress. Such an increase in haze level is objectionable in a clear material, especially a glazing material, and is objectionable in a translucent or opaque material because it causes a change in the uniformity of the color of such a material. The compositions of the present invention because they contain multiple-stage, sequentially produced polymers have the advantages of the previous polymers having a "soft" first stage, i.e., good retention of impact resistance and low haze on exposure to weathering and/or water, and additionally have the advantages in transparent materials of of exhibiting low haze levels at low and high temperatures and upon being subjected to stress, and in translucent or opaque materials of having good color uniformity at low and high temperatures and upon being subjected to stress. The reasons why such multi-stage, sequentially produced polymers exhibit these advantages are not completely understood. However, it is theorized that the attachment of the phases is increased in such a system and that increased attachment prevents the formation of "microvoids" which otherwise would result in permanent haze and which would propoagate to produce crazes which would lead to eventual breakdown of the material. In the multi-stage, sequentially produced polymers, "microvoids" do not form when the polymer is subjected to stress and when the stress is relieved, no permanent haze results. It is theorized that in the multi-stage, sequentially produced polymers of this invention, layers of intermediate stages surround or almost surround the hard, first stage "core" and that the final hard stage, surrounds or nearly surrounds the intermediate stage to give a layered ball in which attachment levels between layers are obtained and that when the layers are firmly attached to one another the formation of "microvoids" requires more energy than is exerted during the stress or temperature change process. Such explanations and theoretical considerations do not constitute a part of the present invention and are not to be considered binding on the scope thereof.

The polymer of the present invention can be produced by any known technique for preparing multiple-stage, sequentially-produced polymers, for example, by emulsion polymerizing a subsequent stage mixture of monomers in the presence of a previously formed polymeric product. In this specification, the term "sequentially emulsion polymerized" or "sequentially emulsion produced" refers to polymers (which term includes copolymers as well as homopolymers) which are prepared in aqueous dispersion or emulsion and in which successive monomer charges are polymerized onto or in the presence of a preformed latex prepared by the polymerization of a prior monomer charge and stage. In this type of polymerization, the succeeding stage is attached to and intimately associated with the preceding stage. Thus, the sequentially prepared polymers of the present invention are made by a process in which the total particle content is substantially constant upon completion of the first-stage polymerization, i.e., new additional and distinct particles are avoided after formation of the first-stage particle.

The polymerizations are carried out in the presence of a catalyst and may include a polymerization regulator which serves as a chain transfer agent. The final particle size of the sequentially produced polymer may vary from 100 to 300 nm. with the preferred range being 160 to 280 nm.

The type and level of emulsifier utilized controls the particle size of the intermediate-stage latex particles. For the most part, the soaps normally used in emulsion polymerization can be used satisfactorily provided care is exercised in utilizing the minimum amount necessary to give the desired result and the polymer is isolated by coagulation. If the latex is isolated by spray drying, the selection of emulsifier becomes more critical since it remains with the polymer.

The level of emulsifier is preferably below one percent by weight, preferably 0.1 to 0.6%, based on the total weight of polymerizable monomers charged in all stages. Useful emulsifying agents include common soaps, alkylbenzenesulfonates, such as sodium dodecyl benzenesulfonate, alkylphenoxypolyethylene sulfonates, sodium lauryl sulfate, salts of long-chain amines, sals of long-chain carboxylic and sulfonic acids, etc. In general, the emulsifier should be compounds containing hydrocarbon groups of 8–22 carbon atoms coupled to highly polar solubilizing groups such as alkali metal and ammonium carboxylate groups, sulfate half ester groups, sulfonate groups, phosphate partial ester groups and the like.

The polymerization medium in each stage will contain an effective amount of a suitable free radical generating polymerization initiator, which is activated either thermally or by an oxidation-reduction (or redox) reaction. The preferred initiators are those which are activated thermally, such as persulfates, since they leave the least inorganic residue; however, redox initiators may be used. Examples of suitable oil-soluble, water-insoluble initiators are combinations such as cumene hydroperoxide-sodium metabisulfite, diisopropylbenzene hydroperoxide-sodium formaldehyde sulfoxylate, tertiary butyl peracetate-sodium hydrosulfite, cumene hydroperoxide-sodium formaldehyde sulfoxylate, etc. Water-soluble redox initiators may also be used; initiator combinations are sodium persulfate-sodium hydrosulfite, potassium persulfate-sodium formaldehyde sulfoxylate, etc.

The multi-stage sequential emulsion polymerization can be carried out at temperatures ranging from about 0° C. to 125° C., with 30° C. to 95° C. being preferred. The polymerization medium may contain, in accordance with known practice, a chain transfer agent such as tertiary dodecyl mercaptan, secondary butyl mercaptan, normal dodecyl mercaptan, and the like, particularly for limiting, where desired, the molecular weight of stages containing lower alkyl methacrylate. The free radical initiator will be used in an effective amount, which will vary depending on the monomers, the temperature and the method of addition, but, generally, the quantity of initiator will vary from about 0.001 to 2% by weight in each polymerization stage based on the weight of the monomer charge but should not exceed about 5% by weight based on the total weight of the monomers charged in all stages.

In addition there may be added to the compositions after polymerization, light stabilizers such as methyl or phenyl salicylate, oxidation inhibitors, such as hydroquinone or one of the amine type rubber antioxidants, fillers, coloring materials and the like as is well understood in the art.

The first stage of the process is the polymeric product of a mixture of 70 to 100 weight percent of a monomer selected from the group consisting of alkyl methacrylate wherein the alkyl group has 1 to 4 carbon atoms, preferably one carbon atom, styrene, substituted styrene, acrylonitrile, methacrylonitrile and combinations thereof; 0 to 30 weight percent of another copolymerizable monoethylenically unsaturated monomer, 0 to 10 weight percent of a copolymerizable polyfunctional crosslinking monomer and 0 to 10 weight percent of a copolymerizable graftlinking monomer such as an allyl, methallyl, or crotyl ester of an $\alpha,\beta$-unsaturated carboxylic acid or diacid. Suitable examples of alkyl methacrylates include methyl methacrylate which is preferred, ethyl methacrylate, isopropyl methacrylate, sec-butyl methacrylate, tert-butyl methacrylate and the like. Suitable examples of substituted styrenes are $\alpha$-methylstyrene, monochlorostyrene, t-butylstyrene and the like. The first stage monomer mixture may have 85 to 99.9 weight percent of the alkyl methacrylate, styrene, substituted styrene, acrylonitrile, methacrylonitrile or combinations thereof, 0.1 to 15 weight percent of the other copolymerizable monoethylenically unsaturated monomer, 0.05 to 5.0 weight percent of the crosslinking monomer or 0.05 to 5.0 weight percent of the graftlinking monomer.

Polymers formed in this first stage must have a glass transition temperature of greater than 25° C., preferably 60° C. or greater. Glass transition temperatures and their determination are well known to those skilled in the art as evidenced by Polymer Handbook, Bandrup et al., Interscience Publishers, div. of J. Wiley and Sons, Inc. (1966), pp. III–61 to III–63; Monomeric Acrylic Esters, Riddle, Rheinhold Publishing Corporation (1954), pp. 58–64 and T. G. Fox, "Bull. Am. Physics Soc.," vol. 1, No. 3, p. 123 (1956).

A preferred first stage for a transparent glazing material is polymerized from 100 weight percent methyl methacrylate. A typical first stage for a suitable system is polymerized from 99.5 to 98 weight percent alkyl methacrylate and 0.5 to 2.0 weight percent copolymerizable polyfunctional crosslinking monomers. Another typical first stage for an all-acrylic system is polymerized from 70 to 95 weight percent alkyl methacrylate and 5 to 30 weight percent copolymerizable monoethylenically unsaturated monomer. Another typical first stage is polymerized from 70 to 95 weight percent alkyl methacrylate, 5 to 30 weight percent copolymerizable monoethylenically unsaturated monomer, and 0.5 to 2.0 weight percent of a copolymerizable polyfunctional crosslinking monomer. One final typical first stage is polymerized from 98 to 99.8 weight percent alkyl methacrylate and 0.2 to 2.0 weight percent of the copolymerizable allyl, methallyl or crotyl ester of an $\alpha,\beta$-unsaturated carboxylic acid or diacid, preferably allyl methacrylate or diallyl maleate.

The term "copolymerizable monoethylenically unsaturated monomer" is well known in the art and refers to a distinct art-recognized group of monomers as evidenced by Pats. 3,224,996; 3,284,399; 3,284,545; 3,288,886; 3,424,823; 3,485,775 and 3,536,788. These monomers may be acrylic monomers such as lower alkyl acrylates and methacrylates, lower alkoxy acrylates, cyanoethyl acrylate, acrylamide, hydroxy lower alkyl acrylates, hydroxy lower alkyl methacrylates, acrylic acid, methacrylic acid and the like.

The term "polyfunctional crosslinking monomer" is also well known and refers to a distinct art-recognized group. As used in the specification and claims attached hereto, the term "polyfunctional crosslinking monomer" includes difunctional or bifunctional crosslinking monomers that is, monomers containing two reactive or functional groups as well as crosslinking monomers containing more than two reactive or functional groups. This monomer should be one that has the ability to uniformly crosslink the particular polymeric stages in which it is present. In the case of the alkyl methacrylate-containing first stage, crosslinking monomers which have this ability are those which are incorporated evenly in the polymerization reaction and independently of the extent of the completion of the reaction. In other words, their rate of consumption is essentially the same as the principal monomer, the alkyl methacrylate. It is preferred to use as the crosslinking monomer for a first stage containing predominately alkyl methacrylate, an alkylene glycol dimethacrylate such as ethylene glycol dimethacrylate; 1,3-butylene glycol dimethacrylate; 1,4-butylene glycol dimethacrylate, and propylene glycol dimethacrylate; for a first stage containing predominately styrene or substituted styrene, the preferred crosslinking monomer is a polyvinyl benzene such as divinyl benzene or trivinyl benzene; for a first stage containing predominately acrylonitrile, an alkylene glycol diacrylate such as ethylene glycol diacrylate, 1,3- or 1,4-butylene glycol diacrylate, etc. is preferred; in the case of mixtures of monomers, mixtures of crosslinking monomers may be preferred.

The first stage and/or subsequent stages of the sequentially produced polymer may be polymerized from monomer mixtures containing a graftlinking monomer. These graftlinking monomers comprise copolymerizable allyl, methallyl or crotyl esters of $\alpha,\beta$-unsaturated carboxylic acids or diacids. Preferred graftlinking monomers are the allyl esters of acrylic acid, methacrylic acid, maleic acid and fumaric acid. Other suitable graftlinkers are disclosed by Owens in U.S. patent application Ser. No. 27,996, Apr. 13, 1970.

The significant characteristic of the graftlinker appears to be the relationship of the unsaturated groups to the ester portion of the monomer. The conjugately unsaturated acid portion of the ester reacts far more readily than the allyl, methallyl or crotyl group in the polymerization of the particular stage in which it is utilized, and is chemically bound to this stage. Thus, a substantial portion of the allyl, methallyl or crotyl groups remains available for reaction during the following stage polymerization to provide graftlinking between the two stages.

Even in the absence of the graftlinker, some type of grafting or other crosslinking may give rise to attachment between the stages. At most, however, this amounts to an attachment of about 5 to 7% of the latter stage polymer to the prior stage, and generally is substantially less. Using a graftlinker in the manner described, attachment from about 5% to greater than 95% of the subsequent stage can be obtained. Among the factors which will influence attachment are the amount of crosslinker, the amount of graftlinker (which to some extent acts as a crosslinker), relative amounts of the stages and the molecular weight of the stages. For the purposes of the present invention, the relative proportions of crosslinker and graftlinker should be adjusted to provide at least 20% attachment of the third stage to the elastomer stage. In general about 0.5% of graftlinker will provide this minimum amount of attachment. In the preferred practice of the invention, the attachment level between stages (B) and (C) should be in the range of about 75–100%.

In the second stage the butadiene, substituted butadiene or alkyl acrylate and other comonomers, if any, are polymerized in the presence of the first stage product. This second stage polymerization forms an elastomeric polymer stage physically entangled on and/or within and at least in part chemically bonded to the hard polymer formed by the first stage polymerization. During the second stage, additional initiator may be added, but essentially no new, additional and distinct particles are produced.

This second stage is the polymeric product of a mixture of 50 to 99.9 weight percent of butadiene, substituted butadiene, an alkyl acrylate wherein the alkyl group has 1 to 8, preferably 1 to 4 carbon atoms or combinations of these monomers, 0 to 49.9 weight percent of a copolymerizable monoethylenically unsaturated monomer, 0.1 to 5.0 weight percent of a copolymerizable graftlinking monomer and 0 to 5.0 weight percent of a copolymerizable crosslinking monomer. This second stage monomer mixture may have 70 to 99.5 weight percent of the butadiene, substituted butadiene, alkyl acrylate or combinations thereof, 0.5 to 30 weight percent of the copolymerizable monoethylenically unsaturated monomer, 0.05 to 5.0 weight percent of the crosslinker or 0.05 to 5.0 weight percent of the graftlinker. Preferably, the second stage is the polymeric product of a monomer mixture of 70 to 99.5 weight percent of the alkyl acrylate, preferably butyl acrylate, and/or of butadiene, 10 to 25 weight percent of the copolymerizable monoethylenically unsaturated monomer preferably styrene and 0.5 to 5.0 weight percent of the graftlinker, preferably allyl methacrylate or diallyl maleate. The weight percents are based on the total weight of the second stage monomer mixture.

Suitable alkyl acrylates in the second stage are those having 1 to 8, preferably 1 to 4, carbon atoms in the alkyl group. The alkyl group can be a straight or branched chain but preferably is a straight chain. Preferred alkyl acrylates are n-butyl acrylate, ethyl acrylate, 2-ethylhexyl acrylate and isobutyl acrylate. Preferred substituted butadienes are isoprene, chloroprene, and 2,3 dimethylbutadiene. The elastomers of this stage are those that have a glass transition temperature of 25° C. or less. Preferred are those elastomers having a glass temperature less than 10° C., and most preferred are those elastomers having a glass temperature less than −10° C. These described glass temperatures refer to the elastomeric portion of the modifier only and do not include any subsequent stages or other polymers attached physically or chemically onto or into the particles of the elastomer and are those temperatures which would characterize the elastomers if its monomers were reacted in the absence of any other polymeric product.

The copolymerizable crosslinking monomers are those which have the ability of uniformly crosslinking the elastomer stage. The preferred crosslinking monomer for the elastomeric stages containing predominately alkyl acrylate is an alkylene glycol diacrylate such as ethylene glycol diacrylate, 1,2- or 1,3-propylene glycol diacrylate, and 1,3- or 1,4-butylene glycol diacrylate. Elastomeric stages of polymers of predominately butadiene or butadiene and styrene have as preferred crosslinkers the polyvinyl benzenes such as divinyl benzene and trivinyl benzene. Combinations of alkyl acrylate, butadiene, and styrene may have as the preferred crosslinking monomers a combination of those listed above. For all -acrylic system the preferred acrylate is n-butyl acrylate and the preferred copolymerizable crosslinking monomer is 1,3-butylene glycol diacrylate.

The copolymerizable monoethylenically unsaturated monomer and the copolymerizable graftlinking monomers are those as described as suitable for formation of the first stage plus styrene, substituted styrene and alkyl methacrylate in the case of the monoethylenically unsaturated monomer. In the second stage, hydroxy lower alkyl acrylates, hydroxy lower alkyl methacrylates, acrylonitrile, styrene and substituted styrenes such as $\alpha$-methyl styrene are specific suitable copolymerizable monoethylenically unsaturated monomers, with styrene and hydroxyethyl methacrylate being preferred.

As pointed out above, the inclusion of the graftlinking monomer into the elastomer stage operates in a fashion which is incompletely understood. However, it is known that the inclusion of the graftlinking monomer operates in a fashion different from the inclusion of crosslinking monomer alone. The inclusion of crosslinking agents, such as butylene glycol diacrylate, divinyl benzene, and the like, effectively crosslink the elastomer stage but do not provide significant graftlinking. To obtain the benefit of this invention it is necessary to provide graftlinking between the elastomer and final hard stage. The inclusion of graftlinking monomers in the elastomeric stage of this invention in transparent and translucent material reduces haze level, either initially or upon exposure to water, temperature changes and/or to stress; in opaque materials the inclusion of graftlinker reduces the color change caused by temperature change and/or stress. It is hypothesized that the graftlinking monomers affect the interfaces between the elastomeric and the hard phases in such fashion that haze formation is effectively eliminated in that no microvoids form. Again this hypothesis remains unproven and should not be considered binding. It has been observed that the benefits of the present invention are not realized when the elastomeric stage is polymerized with too little graftlinking monomer so that not enough of the final rigid thermoplastic is attached to the elastomer particles as a last stage of the polymerization, or when no final rigid stage is polymerized onto the elastomer, i.e., the elastomer stage and the final rigid material are separately prepared and are later combined.

Although the degree of attachment between the elastomer stage and the final rigid stage is a function of a number of factors, it is believed to be primarily dependent upon the degree of residual unsaturation from the graftlinking monomer at the "surface" of the second elastomer stage when polymerization of the final rigid stage commences. The important consideration in the degree of attachment between the final two stages is not the percentage of the total rigid stage which is attached to the elastomer rather, the relative proportions of attached final rigid stage to the intermediate elastomer stage is significant. The amount of attached final rigid stage material is herein considered to be the total final rigid stage material in the polymer or polymer blend less the amount of extractable final rigid stage material. The amount of extractable final rigid stage material is determined by repeatedly extracting 0.5 g. of the polymer with 20 ml. increments of acetone, recovery of the acetone solubles and insolubles, and determination of the amounts. The attachment level is defined as $$\frac{\text{Amount of rigid stage attached}}{\text{Amount of elastomer stage}}$$

The minimum attachment level consistent with the desired objectives has been found to be about 0.20 or 20%. Such levels of attachment are provided by compositions prepared in accordance with the present invention. At attachment levels below about 20%, the advantages of the present invention diminish rapidly and below about 15%, such advantages are substantially lost. No ultimate upper limit has been found to exist, although at very high levels, such as in excess of about 250%, and particularly above about 300%, flow properties of the thermoplastic compositions are detrimentally affected. The excessively stiff and viscous materials are difficult to form.

The final rigid stage is the polymeric product of a mixture of 70 to 100 weight percent of a monomer selected from the group consisting of alkyl methacrylate wherein the alkyl group has 1 to 4 carbon atoms, preferably one carbon atom, styrene, substituted styrene, acrylonitrile, methacrylonitrile and combinations thereof; 0 to 30 weight percent of another copolymerizable monoethylenically unsaturated monomer, and 0 to 10 weight percent of a copolymerizable polyfunctional crosslinking monomer. All of these monomers are those as described as suitable for the formation of the first stage. The final rigid stage monomer mixture may have 85 to 99.9 weight percent of the alkyl methacrylate, styrene, substituted styrene, acrylonitrile, methacrylonitrile or combinations thereof, 0.1 to 15 weight, percent of the other copolymerizable monoethylenically unsaturated monomer, or 0.05 to 5.0 weight percent of the crosslinker. In general it is preferred that the final rigid stage have a composition similar to the composition of the rigid thermoplastic save for the addition of polyfunctional crosslinking monomer and/or chain transfer agents including mercaptans, polymercaptans, and polyhalogen compounds. In general though neither the final or the first rigid stage need be polymerized from the same monomers as the rigid thermoplastic nor need the particular rigid stages themselves be polymerized from the same monomers.

For an all-acrylic system, the $C_1$ to $C_4$ alkyl methacrylates which can be used in the final stage include methyl methacrylate, ethyl methacrylate, isopropyl methacrylate, t-butyl methacrylate and the like. Suitable alkyl acrylates are those having 1 to 4 carbon atoms in the alkyl group. Ethyl acrylate is the preferred alkyl acrylate for this stage. The preferred final stage for the all-acrylic system is 90 to 99.5 weight percent methyl methacrylate and 0.5 to 10 weight percent of alkyl acrylate. A significant limitation on the character of the final or hard stage is its glass transition temperature ($T_g$). The $T_g$ of the last stage should be greater than 25° C., preferably 50° C. or higher. Additionally, for molding powder applications it is important that the hard final stage have a viscosity average molecular weight in the range of 50,000 to 1,000,000. Preferably the molecular weight is 50,000 to 250,000. This molecular weight can be controlled during the polymerization of the final stage by use of chain transfer agents including mercaptans, polymercaptans, and polyhalogen compounds according to procedures known in the art.

For the preparation of transparent compositions, it is important to control the refractive indices and/or the particle size of the stages. Control of the refractive index of such polymers is accomplished by balancing the various proportions, of the diverse monomers and control of particle size is accomplished by balancing emulsifier type and content, initiator type and content and temperature as is well known to those skilled in the art.

The preferred sequentially produced polymer of this invention is a three stage material consisting of a non-elastomeric first stage, a second elastomeric stage and a final, relatively hard stage. However, so long as at least three such stages are present in the sequence of hard stage, elastomeric stage, hard stage, the present invention in its broadest scope covers sequentially produced polymers of any number of stages greater than three. Thus this invention covers compositions having several intermediate stages of alternating hard and elastomeric stage or compositions having several initial, intermediate or final stages polymerized from different monomers or from the same monomers in different proportions.

The sequentially produced polymer is utilized as an additive to other rigid thermoplastics, generally of the same character as the final rigid stage of the polymer, to modify the impact properties thereof. In such contexts, the polymer has advantages over prior art materials in superior handling characteristics, processability, and dispersability properties. Because of the tack and cohesiveness severe difficulties arise when an additive having a final elastomeric stage is blended with a rigid thermoplastic. The polymer of the present invention is not tacky and the particles do not coalesce at ordinary handling conditions. Thus, the polymer of the present invention can be considered analogous to a "master-batch" of the elastomer in at least some senses in which that term is commonly utilized. Since it is the elastomeric stage of the sequentially produced polymer which imparts impact resistance, the polymer is added to a rigid thermoplastic in such proportions that an appropriate proportion of the elastomeric stage is provided, in accordance with the proportions disclosed, and the rigid stages of the polymer may be considered as a part of the total rigid thermoplastic for purpose of determining proportions of such blends.

The amount of elastomeric stage in the blends of the sequentially produced polymer and the rigid thermoplastic varies greatly depending upon the type of elastomer, the type of rigid thermoplastic polymer, and the physical characteristics desired in the final product. It is generally desirable to include at least 1.0 weight percent elastomeric stage in a molding composition to provide significant and commercially important improvements in the processing and physical characteristics. As the elastomeric concentration is increased past 50 weight percent, certain physical characteristics of the combination are adversely affected. The physical characteristics adversely affected at the high elastomer concentration include modulus, hardness, and shrinkage at high service temperatures and turbidity in transparent formulations. Preferably, the elastomeric stage content ranges from 2 to 35 percent by weight of the molding or thermoformable composition, and more preferably is present in the range of 15 to 35 percent by weight most preferably 20 to 30 weight percent of the blend. In terms of proportions of the total multi-phase, sequentially produced polymer to thermoplastic, the compositions of this invention will contain about 10 to 96, preferably 40 to 85, weight percent of the thermoplastic and 90 to 4, preferably 15 to 65, weight percent of the sequentially produced polymer.

The blend of the multi-stage polymer and the rigid thermoplastic can be accomplished by any known method. The rigid thermoplastic and polymer can be prepared by suspending the polymer in the monomer mix used to prepare the rigid thermoplastic or in a monomer-polymer syrup mix which together will yield the desired rigid thermoplastic polymer. The polymer can be placed in the casting mix in the form of an emulsion, suspension, or dispersion in water or an organic compound. The water or organic compound can be removed before or after casting into the rigid thermoplastic. The polymer-rigid thermoplastic blend can be milled to form a well dispersed mixture in an extruder, a roll mill or like equipment to prepare a molding composition. The polymer and the rigid thermoplastic can be blended together while both are in emulsion, suspension or solution in an aqueous or non-aqueous system, the particles being isolated from the water or organic compound by coagulation, spray drying or known means of isolation, and are further processed with or without an intermediate drying step. Another convenient method of blending the multi-stage polymer and the rigid thermoplastic is by suspending the relatively dry coagulated or spray dried polymer in the unpolymerized monomer mix for the rigid thermoplastic and polymerizing the monomer to form the rigid thermoplastic with the elastomer intermixed therein. The bulk casting is then granulated and processed in an extruder, mill, or injection molding equipment. Alternatively, the monomer mix containing the suspended multi-stage polymer can be cast into sheet between glass or metal plates by known techniques. This method is preferred for the preparation of glazing material. The blended compositions of this invention can also be prepared by merely mixing emulsions or suspensions of the rigid thermoplastic polymer and with the multi-stage polymer emulsion, which may be accomplished by preparing the polymer in emulsion or suspension. Additional emulsifiers or suspending agents can be added to generate new particles. The monomer system used to prepare the rigid thermoplastic polymer is then added directly to the suspension and polymerized. Thus the multi-stage modifier and the rigid thermoplastic polymer are prepared in the same emulsion or suspension and can be washed, isolated and processed directly as a one-pot molding composition.

The rigid thermoplastic materials of the compositions of this invention may be characterized as polymerized from a monomer mixture of a majority (e.g. greater than 50 to 100%), preferably 75 to 100, of a monomer selected from the group consisting of alkyl methacrylate wherein the alkyl group has 1 to 4 carbon atoms, styrene, substituted styrene, acrylonitrile, methacrylonitrile and combinations thereof. Without modification, this class of rigid thermoplastic polymers lacks a satisfactory resistance to impact. The rigid thermoplastic polymers as a class and as used in this specification may be more narrowly considered polymers of a monomer selected from the group consisting of alkyl methacrylate wherein the alkyl group has 1 to 4 carbon atoms, preferably one carbon atom, styrene, substituted styrene, acrylonitrile, methacrylonitrile and combinations thereof; and minor amounts, preferably 0 to 25 percent of other monoethylenically unsaturated monomer units to provide well known balances of physical characteristics.

The alkyl methacrylates are those wherein the alkyl group contains 1 to 4 carbon atoms; preferably the alkyl methacrylate is methyl methacrylate.

As used in this specification the group alkyl also includes cycloalkyl, bridged and unbridged, while the group aryl also includes aralkyl and alkaryl. All these groups may be substituted or unsubstituted.

The substituted styrenes include α-methylstyrene, vinyl toluene, halostyrene, t-butyl styrene, and the like. Preferred are styrene and α-methylstyrene.

The substituted acrylonitriles include methacrylonitrile α-methylene glutaronitrile, α-ethylacrylonitrile, α-phenylacrylonitrile and the like. Preferred are acrylonitrile and methacrylonitrile.

These rigid thermoplastics have heat distortion temperatures greater than about 20° C., preferably greater than 50° C., for most general purposes.

Suitable rigid thermoplastics of this invention include copolymers, terpolymers and tetrapolymers of greater than 50 to 100 percent of a monomer selected from the group consisting of alkyl methacrylate wherein the alkyl group has 1 to 4 carbon atoms, preferably one carbon atom, styrene, substituted styrene, acrylonitrile, methacrylonitrile and combinations thereof; and of 0 to less than 50 percent copolymerizable monoethylenically unsaturated monomers such as other alkyl and aryl methacrylates, alkyl and aryl acrylates, alkyl and aryl acrylamides, substituted alkyl and aryl methacrylates and acrylates such as halogen, alkoxy, alkylthio, cyanoalkyl, amino, alkylthiol esters, and other substitutions, vinyl esters, vinyl ethers, vinyl amides, vinyl ketones, vinyl halides, vinylidene halides, and olefins. Generally, as the comonomer system chosen is softer, less is used in order to retain the rigid characteristics desired.

It is normal practice to include in compositions, such as those presently claimed, compounds and materials which stabilize the products and inhibit oxidative, thermal, and ultraviolet light degradation. Such practices are contemplated within the scope of the present invention, and appropriate stabilizers are ordinarily incorporated into the composite interpolymer and into blends of the composite interpolymer with other materials. Stabilizers can be included at any stage from the polymerization process whereby the composite and/or the materials with which the composite is blended are formed, to the final step of forming the final product. It is preferred that stabilizers be included early in the life of such polymers to preclude the initiation of degradation before the material can be protected. Accordingly, the preferred practice is to include stabilizers in the polymerization process, if compatible therewith, or in the polymer emulsion resulting from the polymerization.

The oxidative and thermal stabilizers useful in the materials of the present invention include those used in addition polymers generally. They include, for example, hindered phenols, hydroquinones, phosphites, and varieties of substituted members of those groups and combinations thereof.

The ultraviolet light stabilizers can also be those used in addition polymers generally. Examples of ultraviolet light stabilizers include various substituted resorcinols, salicylates, benzotriazoles, benzophenones, and the like.

Other inclusions in the materials of the present invention include lubricants, such as stearic acid, stearic alcohol, eicosanol, and other known types; colorants, including organic dyes, such as Anthraquinone Red and the like, organic pigments and lakes, such as Phthalocyanine Blue and the like, and inorganic pigments, such as titanium dioxide, cadmium sulfide, and the like; fillers and particulate extenders, such as carbon black, amorphous silica, asbestos, glass fibers, magnesium carbonate, and the like; plasticizers, such as dioctyl phthalate, dibenzyl phthalate, butyl benzyl phthalate, hydrocarbon oils, and the like.

While only a few of such materials have been specifically recited, it is not intended to exclude others; the recitation is exemplary only, and each category of additive is common and well known in the art, including extremely large numbers of materials which are equally well suited for inclusion in the materials of the present invention.

Such inclusions in the materials of the present invention can be made at any stage of preparation, in accordance with techniques well known to those of ordinary skill in the art, in proportions which are commonly employed.

To assist those skilled in the art in the practice of the present invention the following modes of operation are set forth as illustrations, parts and percentages being by weight unless otherwise noted. The following abbreviations are used in these examples: acrylonitrile (AN), allyl methacrylate (ALMA), butyl acrylate (BA), butadiene (Bd), butylene glycol diacrylate (BDA), diallyl maleate (DALM), divinylbenzene (DVB), ethyl acrylate (EA), methyl methacrylate (MMA), α-methylstyrene (α-MeS), and styrene (S), slash (/) is used to separate designated monomers that are copolymerized to form a single stage and double slash (//) separates monomers of different stages. A description of the ASTM methods and the VHIT test used herein are given in Owens, Ser. No. 27,996.

EXAMPLE 1

This example illustrates the preparation of a multiple-stage, sequentially-produced polymer of composition

MMA/DALM//BA/BDA/DALM//MMA/EA

250/0.06//50/0.1/0.4//24/1 parts by weight.

A monomer charge of 25 parts of methyl methacrylate and 0.05 part of diallyl maleate is emulsified in water using sodium dioctyl sulfosuccinate as the emulsifier and using potassium carbonate to control the pH. The monomer charge is polymerized using potassium persulfate at elevated temperatures. A second monomer charge of 50 parts of butyl acrylate, 0.1 part of 1,3-butylene glycol diacrylate and 0.4 part of diallyl maleate is then added to the preformed polymer emulsion and is polymerized using potassium persulfate at elevated temperatures controlling the amount of soap added to prevent the formation of a significant number of new particles. A third monomer charge of 24 parts of methyl methacrylate and 1.0 part of ethyl acrylate is then added to the above polymer emulsion and is polymerized using potassium persulfate at elevated temperatures while controlling the amount of soap added to prevent the formation of a significant number of new particles. A chain transfer agent may be added to control the molecular weight of the rigid poly(methyl methacrylate) phases. The polymer is isolated by coagulation or preferably by spray drying.

This hard core thermoplastic material is blended with 50% of poly(methyl methacrylate) molding powder pellets (MMA/EA=96/4) by blending in an extruder at a melt temperature of 300° C. and a die pressure of 850 p.s.i.g. to give a translucent, rigid thermoplastic containing 25.1% elastomer. Test pieces are then injection molded from the blend. The properties are: flexural modulus of 190,000 p.s.i.; Izod notched impact strengths of 0.84 ft.-lb./in. of notch at 23° C., 0.66 ft.-lb./in. of notch at 0° C. and 059 ft.-lb./in. of notch at −18° C. all measured on ¼" bars; total white light transmission of 37% and 62% haze at 23° C. both of which change less than 5% at 0° C. and at 70° C. or when impacted at 80 inch pounds. The pellets are extruded to sheet and give a clear, translucent sheet having properties similar to those shown above.

EXAMPLES 2-7

A series of multi-stage, sequentially-produced interpolymers is prepared to illustrate the haze resistant high impact rigid thermoplastics of the present invention. The compositions are varied to show the effect of amount of final rigid stage in blends of interpolymer with rigid thermoplastic polymer. Six different compositions are prepared and tested in accordance with the procedure of Example 1. The results are reported in Table I. Included in Table I are test data on a blend of a two-stage interpolymer which lacks a hard core (first stage) of rigid thermoplastic polymer prepared according to the procedure of Owens, U.S. patent application, Ser. No. 27,996. From the data in Table I, it is evident that hard core interpolymers having greater than 10% final hard stage are superior to materials prepared without a hard core and are superior to multi-stage, sequentially prepared materials having 10% or less final hard stage.

a powder which is fused on a roll mill. The material from the roll mill is compression molded into a slab. The physical properties are:

Flexural modulus: 200,000 p.s.i.
Izod impact strength, ¼" bar, 23° C.: 0.75 ft.-lb./in. of notch.

The material transmits 88% of total white light, has 6.0% haze at 23° C., 6.3% haze at 0° C., 6.5% haze at 70° C. and 7.2% haze on being exposed to 100% relative humidity at 50° C. for 72 hours. The material exhibits no permanent stress whitening at an applied force of 60 inch pounds.

EXAMPLE 10

A multi-stage, sequentially-prepared thermoplastic polymer of composition MMA/1,3-butylene glycol dimethacrylate/DALM//2-ethylhexyl acrylate/S/ALMA//MMA/EA=37.5/0.4/0.1//38.5/9/1.4//14.4/0.6 is prepared by the procedure of Example 1; the interpolymer latex is added directly to molten rigid thermoplastic of Example 1, to provide a blend containing 25% elastomeric stage, in a starved-screw devolatilizing extruder maintained at elevated pressure. Water is removed in the liquid phase from the blend. A minor amount of residual water and unpolymerized monomers are vented under reduced pressure from the barrel of the extruder. The blend is extruded through a die and is chopped to pro-

TABLE I

| Ex. No. | Hard core thermoplastic material Composition | Rigid thermoplastic Composition Wt., per- cent | MMA/ EA= | Prepared | Mv× 10⁻³ | Wt., percent, elastomer | Flexural modulus ×10⁻³, p.s.i. | Izod | VHIT, in.-lbs. Stress whiten- ing | Back crack- ing | Percent haze 0° C. | 23° C. | 70° C. |
|---|---|---|---|---|---|---|---|---|---|---|---|---|---|
| | MMA/ALMA//BA/S/ALMA// MMA/EA= | | | | | | | | | | | | |
| 2 | 30/0.06//40.5/9.5/1.0//19.2/0.8. | 50 | 96/4 | Emulsion | 110 | 25.2 | 179 | 1.14 | 60 | 100 | 6.3 | 6.0 | 6.5 |
| 3 | 37.5/0.075//38.5/9/0.95//14.4/0.6. | 52.6 | 96/4 | Bulk | 120 | 25.2 | | 0.80 | 80 | 120 | 5.2 | 5.0 | 5.7 |
| 4 | 40/0.08//40.5/9.5/1.0//9.6/0.4. | 50 | 96/4 | do | 120 | 25.2 | | 0.33 | 40 | 80 | | | |
| 5 | 42.5/0.085//42.5/10/1.05//4.8/0.2. | 50 | 96/4 | do | 120 | 26.5 | | 0.25 | 30 | 60 | | | |
| 6 | MMA/ALMA//BA/S/ALMA= 45/0.09//44.55/10.45/1.1. | 50 | 96/4 | do | 120 | 27.7 | | 0.15 | | | | | |
| 7 | MMA/ALMA//BA/S/BDA/ ALMA//MMA/EA=30/0.06// 32.4/7.6/0.2/0.4//28.8/1.2. | 62.5 | 96/4 | do | 120 | 25.2 | 210 | 0.80 | 60 | 120 | | | |
| | BA/S/HPMA/BDA/ALMA// MMA/MA=56.4/12.6/1.0/0.35/ 0.14//28.5/1.5. | 42.9 | 96/4 | do | 155 | 30 | 210 | 0.70 | 10 | 60 | 12.3 | 3.9 | 11.2 |

¼" notched, izod impact strength, ft.-lb./in. of notch.

EXAMPLE 8

An emulsion containing polymer of composition

MMA/ALMA//BA/S/BDA/ALMA//MMA/EA=
30/0.1//33/7/0.1/0.7//28.5/1.5 is prepared by the procedure of Example 1. The emulsion is coagulated by pouring one part of emulsion into 10 parts of a rapidly stirred aqueous solution containing 2 parts of calcium chloride per 100 parts of water. The coagulum is washed with water and is dried. The dried multi-stage, sequentially polymerized polymer (62.5 parts) is then blended in an extruder with 37.5 parts of the rigid thermoplastic of Example I and the extrudate is chopped into pellets; test pieces are injection molded from the pellets. The physical properties of the blend are:

Flexural modulus: 210,000 p.s.i.
Izod impact strength, ¼" bar, 23° C.: 0.85 ft.-lb./in. of notch.

The material shows no permanent whitening when impacted by a projectile having a force of 80 inch pounds.

EXAMPLE 9

A multi-stage, sequentially-produced polymer of composition MMA/DALM//BA/S/DALM//MMA/EA=20/0.05//41/9/1.0//28.8/1.2 is prepared in emulsion which is blended with an equal amount of an emulsion containing a MMA/EA=96/4 copolymer of molecular weight 150,000. The emulsion blend is spray dried to give vide a granular molding powder, a portion of which is then formed into slabs having the properties:

Flexural modulus: 185,000 p.s.i.
Izod impact strength, ¼" bar, 23° C.; 0.77 ft.-lb./in. of notch
DTUFL (264 p.s.i.): 80° C.
TWLT: 87.5%
Haze: 5.0% at 23° C.; 5.2% at 0° C.; 5.7% at 70° C.
Stress whitening: negligible at applied force of 80 inch pounds.

The blend in the extruder is extruded through a sheet die and the sheet is passed through polishing rolls to give ⅛" thick sheet having the properties:

Flexural modulus: 190,000 p.s.i.
Izod impact strength, ⅛" bar, 23° C.: 1.1 ft.-lbs./in. of notch.
TWLT: 89.5%
Haze, 23° C.: 3.7%
DTUFL (264 p.s.i.): 8.2° C.

The sheet, mounted in a window frame, neither breaks nor shows permanent stress whitening upon being struck with thrown rocks.

EXAMPLE 11

A multi-stage, sequentially-produced polymer of composition S/ALMA//Bd/S/ALMA//S=25/0.1//35/15/0.5//25 is produced by the procedure of Example 1. The thermoplastic elastomer-containing polymer is isolated by spray drying and is blended with polystyrene granules on a roll mill to give a 20 percent by weight concentration of elastomeric phase and the blend is compression molded into a slab with the properties:

Flexural modulus: 250,000 p.s.i.
Izod impact strength, ¼" bar, 23° C.: 0.8 ft.-lbs./in. of notch
Vicat softening temperature: 200° F.

The material is clear with 10% haze at 23° C. which does not change appreciably at 0° C. or at 70° C. The material does not stress whiten at an applied force of 70 inch pounds.

EXAMPLE 12

A multi-stage, sequentially prepared thermoplastic polymer of composition MMA/ALMA//isobutyl acrylate/ALMA//MMA/S=30/0.06//40/0.8//26/4 is produced as a powder by the procedure of Example 2. The powder (50 parts) is blended with 50 parts of a MMA/S=65/35 copolymer of molecular weight 125,000 on a roll mill and the blend is compression molded to give a translucent slab with a modulus of 200,000, an Izod notched impact strength of 1.0 ft.-lb./in. of notch (⅛" bar), a Vicat softening temperature of 190° F. The material shows no permanent increase in haze when impacted with a force of 80 inch pounds and a pigmented sample shows no permanent change in color when impacted with a force of 60 inch pounds.

EXAMPLE 13

This example illustrates the preparation of a multi-stage, sequentially-prepared polymer of composition MMA/ALMA//Bd/ALMA//MMA/ALMA//S/AN
=30/0.06//40/0.2//10/0/0.1//14/6.

A monomer charge of 30 parts of methyl methacrylate and 0.06 part of allyl methacrylate is emulsified in water using sodium dodecylbenzenesulfonate as the emulsifier. The monomer charge is polymerized at elevated temperature using sodium persulfate as the initiator. A second stage is polymerized in the presence of the first stage by adding 0.12 part of sodium formaldehyde sulfoxylate and 4 parts of emulsifier followed by the gradual addition of 40 parts of butadiene and of a mixture of 0.8 part of allyl methacrylate and 0.24 part of cumene hydroperoxide. A third stage is polymerized in the presence of the first two stages by the addition of sodium persulfate, 10 parts of methyl methacrylate and 0.1 part of allyl methacrylate controlling the amount of sodium dodecylbenzene sulfonate added to prevent the formation of a significant number of new particles. A fourth stage is then polymerized onto the preceding three stages by polymerizing with sodium persulfate at elevated temperature a mixture of 14 parts of styrene and 6 parts of acrylonitrile while controlling the amount of sodium dodecylbenzenesulfonate added to prevent the formation of a significant number of new particles. The polymer is isolated as a powder by pouring 100 parts of the emulsion into 500 parts of water containing 10 parts of calcium chloride, with stirring of the mixture, and washing and drying of the coagulum. The elastomer-containing polymer powder (40 parts) is blended with 60 parts of a S/AN=70/30 copolymer on a roll mill. The blend is compression molded to give an opaque slab having an Izod impact strength (notched) (⅛" bar) of 3.5 ft.-lbs./in. of notch and a Vicat temperature of 200° F. A pigmented sample shows no permanent color change when subjected to a force of 80 inch pounds.

EXAMPLE 14

A multi-stage, sequentially-produced polymer powder of composition MMA/ALMA//BA/ALMA//S/AN=30/0.1//40/1.0//28/12 is prepared and isolated by the procedure of Example 2. The interpolymer powder is blended with a S/AN=68/32 copolymer on a roll mill and the blend is molded into an opaque slab with the following properties:

Izod notched impact strength, ⅛" bar: 1.1 ft.-lbs./in. of notch
Vicat softening temperature: 200° F.
Young's modulus in tension: 350,000 p.s.i.

A pigmented sample shows no permanent color change on being impacted with a force of 60 inch pounds.

EXAMPLE 15

This example illustrates the production of a five-stage, sequentially-prepared thermoplastic interpolymer of composition S/AN/ALMA//BA/ALMA//S/
  ALMA//BA/ALMA//S/AN=14/6/0.04//25/
    0.5//10/0.3//25/0.75//14/6 parts by weight.

A monomer charge of 14 parts of styrene, 14 parts of acrylonitrile and 0.04 part of allyl methacrylate is emulsified in water using sodium dioctyl sulfosuccinate as the emulsifier and using sodium persulfate to control the pH. The monomer charge is polymerized using sodium persulfate at elevated temperatures. A second monomer charge of 25 parts of butyl acrylate and 0.5 part of allyl methacrylate is then added to the preformed polymer emulsion and is polymerized using sodium persulfate at elevated temperatures controlling the amount of emulsifier added to prevent the formation of a significant number of new particles. This polymerization procedure is then repeated with a third monomer charge of 10 parts of styrene and 0.3 part of allyl methacrylate, a fourth monomer charge of 25 parts of butyl acrylate and 0.75 part of allyl methacrylate and finally a fifth monomer charge consisting of 14 parts of styrene and 6 parts of acrylonitrile. To 50 parts of the emulsion containing 40% of the five-stage, sequentially-prepared polymer is added 1200 parts of an emulsion containing 40% of a S/AN=70/30 copolymer; the emulsion blend is coagulated by pouring 1 volume of the blend into 5 volumes of rapidly stirred aqueous 2% calcium chloride solution. The isolated thermoplastic containing about 14.7% elastomer is washed with water dried in vacuo, and is extruded into about ⅛" thick sheet through a die. The physical properties are:

Flexural modulus: 250,000 p.s.i.
Izod impact strength, notched ⅛" bar: 4 ft.-lbs./in. of notch
DTUFL, 264 p.s.i.: 180° F.
TWLT: 85%.
Haze: 12%.

The haze level is essentially unchanged at lower or higher temperature and suffers no permanent change when the test piece is subjected to a force of 7 foot-pounds.

EXAMPLE 16

A three-stage, sequentially-produced interpolymer powder (30 parts) of composition MMA/S/AN/ALMA//Bd/S/
  DALM//MMA/S/AN=12.25/12.25/
    10.5/0.1//33/12/0.5//7/7/6 prepared and isolated by the procedure of Example 2 is blended with 70 parts of a MMA/S/AN=35/35/30 terpolymer on a roll mill and the blend containing about 13.5% elastomer is compression molded into a clear slab with the following properties:

Flexural modulus: 270,000 p.s.i.
Izod impact strength, ⅛" bar, 23° C.: 4.5 ft.-lbs./in. of notch
DTUL: 80° C.
TWLT: 86%.
Haze: 11%.

The haze is unchanged at 0° C. and at 70° C. There is no permanent increase in haze on subjecting the test piece to a force of 80-inch-pounds.

EXAMPLE 17

A five-stage, sequentially-produced interpolymer of composition

MMA/α-MeS/ALMA//BA/ALMA//MMA/α-MeS/ALMA//BA/ALMA//MMA/α-MeS/EA=15/5/0.05//20/0.6//15/5/0.4//20/0.6//0.6/14/5/1 is prepared in emulsion by the procedure of Example 9. To 500 parts of emulsion containing 40% of the five-stage, sequentially produced interpolymer is added 500 parts of emulsion containing 40% terpolymer of composition MMA/S/EA=74/25/1; the emulsion blend is spray dried; the spray dried powder is washed with water to remove soluble material, and the powder is then dried and extruded into sheet of about ⅛" thickness having the following properties:

Izod impact strength, ⅛" bar, 23° C.: 1.3 ft.-lbs./in. of notch
DTUFL: 90° C.
TWLT: 87%
Haze: 11%.

The haze is essentially unchanged at higher or lower temperature and suffers no permanent increase when the test piece is subjected to a force of 70 inch-pounds.

EXAMPLE 18

A five-stage, sequentially-produced interpolymer of composition

MMA/S/ALMA//BA/ALMA//MMA/S/ALMA//BA/ALMA//AN/S=10/10/0.05//25/0.75//5/5/0.2//25/0.75//14/6 is prepared in emulsion by the procedure of Example 9. To 250 parts of emulsion containing 40% of the five-stage, sequentially-produced interpolymer is added 750 parts of an emulsion containing 40 parts of an AN/S=70/30 copolymer and the emulsion blend is spray dried to give a powder which is milled on a roll mill and is then compression molded into a clear slab with the following properties:

Izod impact strength, ⅛" bar, 23° C.: 1.1 ft.-lbs./in. of notch
Vicat softening temperature: 85° C.
TWLT: 85%
Haze: 15%.

There was no permanent increase in haze when the test piece is subjected to a force of 70 inch-pounds.

EXAMPLE 19

Fifty parts of spray dried hard core thermoplastic material of Example 10 and 50 parts of methyl methacrylate containing 0.35 part of t-butyl peroxypivalate and 0.4 part of azo-bis-isobutyronitrile are blended on an unheated, two-roll, rubber mill for five minutes. The sheet is then polymerized between metal sheets under pressure to an ultimate temperature of 130° C. The sheet has an Izod notched impact strength (¼") of 0.8 ft.-lb./in. of notch, a flexural modulus of 200,000 p.s.i., and does not exhibit stress whitening when impacted by a thrown rock. The haze is 6% at 24° C. and is essentially unchanged at 50° C. and on immersion in water at 50° C. for 12 days.

EXAMPLE 20

A three-stage, sequentially-produced thermoplastic interpolymer of composition

MMA/ALMA//BA/S/ALMA//MMA/EA=30/0.06//32.4/7.6/0.8//28.8/1.2 is prepared in emulsion by the technique used in Example 1. A portion of the latex is blended with a MMA/EA/t-DDM=96/4/0.5 copolymer emulsion to give blend containing 25% elastomeric stage and the emulsion blend is spray dried. The spray dried powder is milled on a two-roll rubber mill at 425° F. for 5 minutes and a sheet is then compression molded and tested. The results are shown in the attached table as Example A.

A portion of the interpolymer emulsion is spray dried; 45 parts of the interpolymer powder is suspended in a mixture of 55 parts of methyl methacrylate monomer, 0.75 part of t-butyl peroxypivalate and 0.02 part of azo-bis-isobutyronitrile by milling on an unheated two-roll rubber mill. The mixture is then polymerized at elevated temperatures between chromed steel plates to give a sheet containing 18% elastomeric stage which is tested. The results are shown in the attached table as Example B.

The following procedures illustrate the preparation of compositions that are not within the scope of the present invention. A two-stage interpolymer of composition

MMA/ALMA//BA/S/ALMA=45/0.09//44.55/10.45/1.1 is prepared in emulsion by the technique of Example 1 omitting the third stage. The emulsion is spray dried, and 45 parts of the spray dried interpolymer is suspended in a mixture of 55 parts of methyl methacrylate monomer, 0.175 part of t-butyl peroxyisobutyrate and 0.02 part o fazo-bis-isobutyronitrile by milling on an unheated roll mill. The mixture is then polymerized at elevated temperatures between chromed steel plates to give a sheet containing 25% elastomeric stage which is tested. The results are shown in the attached table as Example C.

Fifty parts of the two-stage interpolymer is blended with 50 parts of MMA/EA=96/4 molding powder pellets on a two-roll rubber mill and the blend is compression molded to a sheet which is tested. The results are shown as Example D.

| | Percent elastomeric stage | Izod notched impact strength | Permanent stress whitening at, inch pounds |
|---|---|---|---|
| A | 25 | 1.06 | 80 |
| B | 18 | 0.85 | 60 |
| C | 25 | 0.97 | 15 |
| D | 27.5 | 0.15 | 10 |

These data show that while the composition C has reasonable Izod impact strength, it stress whitens badly at low stress. A blend of a two-stage interpolymer which lacks a rigid final stage with a rigid thermoplastic (composition D) has poor Izod impact strength and stress whitens at low stress.

What is claimed is:

1. A thermoplastic composition comprising a blend of about 10 to 96 weight percent of a rigid thermoplastic polymer selected from the group consisting of homopolymers of an alkyl methacrylate wherein the alkyl group has 1 to 4 carbon atoms and copolymers of monomeric material comprising greater than 50 weight percent of at least one of the aforesaid monomers and the balance, to make 100%, of at least one other copolymerizable monoethylenically unsaturated monomer, and 90 to 4 weight percent of a multi-stage, sequentially-produced polymer characterized by; (A) a non-elastomeric, relatively hard first stage having a glass transition temperature of greater than 25° C., polymerized from a monomer mixture comprising 70 to 100 weight percent of at least one of the monomers specifically mentioned above for the rigid thermoplastic polymer, 0 to 10 weight percent of a copolymerizable polyfunctional crosslinking monomer, and 0.05 to 5.0 weight percent of a copolymerizable graftlinking monomer; (B) an intermediate elastomeric stage, polymerized in the presence of a product containing the first stage, from a monomer mixture comprising 50 to 99.9 weight percent of an alkyl acrylate wherein the alkyl group contains 1 to 8 carbon atoms or mixtures thereof, 0 to 49.9 weight percent of a copolymerizable monoethylenically unsaturated monomer, 0 to 5.0 weight percent of a copolymerizable polyfunctional crosslinking monomer and 0.05 to 5.0 weight percent of a copolymerizable graftlinking monomer, the latter stage further characterized in that it would exhibit a glass transition temperature of 25° C. or less if the monomers were polymerized in the absence of the product containing the first stage, and (C) a final stage polymerized in the presence of a product containing said first and said intermediate stages from a monomer mixture comprising 70 to 100 weight percent of at least one of the monomers specifically mentioned above for the rigid thermoplastic polymer, the final stage further characterized in that it would exhibit a glass transition temperature of greater than 25° C. if the monomers were polymerized in the absence of the product containing the first and intermediate stages, said graftlinking monomer having two or more addition polymerizable unsaturated reactive groups which participate in the polymerization reaction at substantially different rates and said cross-linking monomer having a plurality of addition polymerizable unsaturated groups all of which participate in the polymerization reaction at about the same rate as one another.

2. A composition according to claim 1 wherein the multi-stage, sequentially produced polymer is characterized by 10 to 40 percent by weight (A), 20 to 60 percent by weight (B) and 10 to 70 percent by weight (C), all percentages based on the total weight of the three-stage polymer.

3. A composition according to claim 1 wherein the multi-stage, sequentially produced polymer is characterized by 20 to 40 percent by weight (A), 30 to 50 percent by weight (B) and 15 to 50 percent by weight (C), all percentages based on the total weight of the three-stage polymer.

4. A composition according to claim 1 wherein the multi-stage, sequentially produced polymer is characterized by a non-elastomeric, hard first stage polymerized from a monomer material consisting of 100 weight percent methyl methacrylate.

5. The composition of claim 1 wherein the multi-stage polymer is characterized by a first stage polymerized from a monomer mixture of 99.5 to 98 weight percent alkyl methacrylate and 0.5 to 2.0 weight percent copolymerizable polyfunctional crosslinking monomer.

6. The composition of claim 1 wherein the blend comprises a rigid thermoplastic polymer of greater than 50 to 100 weight percent alkyl methacrylate.

7. The composition of claim 1 wherein the blend comprises a rigid thermoplastic polymer of greater than 50 to 100 weight percent styrene.

8. The composition of claim 1 wherein the blend comprises a rigid thermoplastic polymer of greater than 50 to 100 weight percent acrylonitrile.

9. The composition of claim 1 wherein the polymer is characterized by a first stage polymerized from a monomer mixture of 98 to 99.8 weight percent alkyl methacrylate and 0.2 to 2.0 weight percent of the copolymerizable allyl, methallyl or crotyl ester of an $\alpha,\beta$-unsaturated carboxylic acid or dicarboxylic acid.

10. The copolymer of claim 9 wherein the copolymerizable ester is allyl methacrylate.

11. The composition of claim 9 wherein the multi-stage polymer is characterized by an intermediate, elastomeric stage (B) polymerized from a monomer mixture of 70 to 99.5 weight percent alkyl acrylate, 10 to 25 weight percent copolymerizable monoethylenically unsaturated monomer and 0.5 to 5.0 of copolymerizable allyl, methallyl or crotyl ester of an $\alpha,\beta$-unsaturated carboxylic acid or dicarboxylic acid.

12. The composition of claim 11 wherein the multi-stage polymer is characterized by a final hard stage (C) polymerized from a mixture of 90 to 99.5 weight percent methyl methacrylate and 0.5 to 10 weight percent alkyl acrylate.

13. The composition of claim 12 wherein the blend comprises a rigid thermoplastic polymer of 70 to 100 weight percent alkyl methacrylate.

14. A molding composition consisting essentially of the thermoplastic composition of claim 13.

15. A sheet produced from the thermoplastic composition of claim 13.

16. A glazing material produced from the thermoplastic composition of claim 13.

17. The composition of claim 1 wherein the multi-stage polymer is characterized by an intermediate, elastomeric stage (B) polymerized from a monomer mixture of 70 to 99.5 weight percent alkyl acrylate, 10 to 25 weight percent copolymerizable monoethylenically unsaturated monomer, 0 to 5 weight percent of a crosslinking monomer and 0.5 to 5.0 weight percent of the copolymerizable allyl, methallyl or crotyl ester of an $\alpha,\beta$-unsaturated carboxylic acid or dicarboxylic acid.

18. The composition of claim 17 wherein the multi-stage polymer is characterized by an intermediate stage (B) polymerized from a monomer mixture of butyl acrylate, 1,3-butylene glycol diacrylate and diallyl maleate.

19. The composition of claim 17 wherein the multi-stage polymer is characterized by an intermediate stage (B) polymerized from a monomer mixture of butyl acrylate, styrene and allyl methacrylate.

20. The composition of claim 1 wherein the multi-stage polymer is characterized by a final hard stage (C) polymerized from a mixture of 90 to 99.5 weight percent methyl methacrylate and 0.5 to 10 weight percent alkyl acrylate.

21. The composition of claim 20 wherein (C) is polymerized from a mixture of methyl methacrylate and ethyl acrylate.

22. A thermoplastic composition comprising a blend of about 10 to 96 weight percent of a rigid thermoplastic polymer selected from the group consisting of homopolymers of a monomer selected from the group consisting of alkyl methacrylates wherein the alkyl group has 1 to 4 carbon atoms, styrene, substituted styrene, acrylonitrile, methacrylonitrile and mixtures thereof and copolymers of monomeric material comprising greater than 50 weight percent of at least one of these monomers and the balance, to make 100%, of at least one other copolymerizable monoethylenically unsaturated monomer, and 90 to 4 weight percent of a multi-stage, sequentially-produced polymer characterized by; (A) a non-elastomeric, relatively hard first stage having a glass transition temperature of greater than 25° C., polymerized from a monomer mixture comprising 70 to 100 weight percent of at least one of the monomers specifically mentioned above for the rigid thermoplastic polymer, 0 to 10 weight percent of a copolymerizable polyfunctional crosslinking monomer, and 0.05 to 5.0 weight percent of a copolymerizable graft-linking monomer selected from the group consisting of allyl, methallyl, and crotyl esters of an acid selected from the group consisting of acrylic, methacrylic, maleic, and fumaric acids; (B) an intermediate, elastomeric stage polymerized in the presence of a product containing the first stage from a monomer mixture comprising 50 to 99.9 weight percent of an alkyl acrylate wherein the alkyl group contains 1 to 8 carbon atoms or mixtures thereof, 0 to 49.9 weight percent of a copolymerizable monoethylenically unsaturated monomer, 0 to 5.0 weight percent of a copolymerizable polyfunctional crosslinking monomer and 0.05 to 5.0 weight percent of a copolymerizable graftlinking monomer selected from the group consisting of allyl, methallyl, and crotyl esters of an acid selected from the group consisting of acrylic, methacrylic, maleic, and fumaric acids, the elastomeric stage further characterized in that it would exhibit a glass transition temperature of 25° C. or less if the monomers were polymerized in the absence of the product containing the first stage, and (C) a final stage polymerized in the presence of a product containing said first and said intermediate stages from a monomer mixture comprising 70 to 100 weight percent of at least one of the monomers specifically mentioned above for the rigid thermoplastic polymer, the final stage further characterized in that it would exhibit a glass transition temperature of greater than 25° C. if the monomers were polymerized in the absence of the product containing the first and intermediate stages, said graftlinking monomer having two or more addition polymerizable unsaturated reactive groups which participate in the polymerization reaction at substantially different rates and said cross-linking monomer having a plurality of addition polymerizable unsaturated groups all of which participate in the polymerization reaction at about the same rate as one another.

23. A thermoplastic composition comprising a blend of about 10 to 96 weight percent of a rigid thermoplastic polymer selected from the group consisting of homopolymers of an alkyl methacrylate wherein the alkyl group has 1 to 4 carbon atoms and copolymers of monomeric material comprising greater than 50 weight percent of at least one of the aforesaid monomers and the balance, to make 100%, of at least one other copolymerizable monoethylenically unsaturated monomer, and 90 to 4 weight percent of a multi-stage, sequentially-produced polymer characterized by; (A) a non-elastomeric, relatively hard first stage having a glass transition temperature of greater than 25° C., polymerized from a monomer mixture comprising 80 to 100 weight percent of at least one of the monomers specifically mentioned above for the rigid thermoplastic polymer, 0 to 10 weight percent of a copolymerizable polyfunctional crosslinking monomer, and 0.05 to 5.0 weight percent of a copolymerizable graftlinking monomer selected from the group consisting of allyl, methallyl, and crotyl esters of an acid selected from the group consisting of acrylic, methacrylic, maleic, and fumaric acids; (B) an intermediate, elastomeric stage polymerized in the presence of a product containing the first stage from a monomer mixture comprising 50 to 99.9 weight percent of monomer selected from the group consisting of butadiene, substituted butadiene, an alkyl acrylate wherein the alkyl group contains 1 to 8 carbon atoms or mixtures thereof, 0 to 49.9 weight percent of a copolymerizable monomethylenically unsaturated monomer, 0 to 5.0 weight percent of a copolymerizable polyfunctional crosslinking monomer and 0.05 to 5.0 weight percent of a copolymerizable graftlinking monomer selected from the group consisting of allyl, methallyl, and crotyl esters of an acid selected from the group consisting of acrylic, methacrylic, maleic, and fumaric acids, the elastomeric stage further characterized in that it would exhibit a glass transition temperature of 25° C. or less if the monomers were polymerized in the absence of the product containing the first stage, and (C) a final stage polymerized in the presence of a product containing said first and said intermediate stages from a monomer mixture comprising 70 to 100 weight percent of at least one of the monomers specifically mentioned above for the rigid thermoplastic polymer, the final stage further characterized in that it would exhibit a glass transition temperature of greater than 25° C. if the monomers were polymerized in the absence of the product containing the first and intermediate stages, said graftlinking monomer having two or more addition polymerizable unsaturated reactive groups which participate in the polymerization reaction at substantially different rates and said crosslinking monomer having a plurality of addition polymerizable unsaturated groups all of which participate in the polymerization reaction at about the same rate as one another.

References Cited
UNITED STATES PATENTS 3,426,101   2/1969   Ryan et al. _____ 260—876

MURRAY TILLMAN, Primary Examiner

J. ZIEGLER, Assistant Examiner

U.S. Cl. X.R.

161—247, 409; 260—29.6 PM, 29.7 EN, 41 R, A, AG, 879, 881, 883, 885

UNITED STATES PATENT OFFICE
CERTIFICATE OF CORRECTION

Patent No. 3,793,402    Dated 2/19/74

Inventor(s) Frederick H. Owens

It is certified that error appears in the above-identified patent and that said Letters Patent are hereby corrected as shown below:

In the specification make the following changes:

Col. 1, line 64, delete comma

Col. 3, line 63, delete comma after stage

Col. 5, line 42, instead of "Rheinhold" should be -- Reinhold --

Col. 12, line 37, instead of "(S)," should be --(S);--

Col. 14, line 67, instead of "DTUFL (264 psi.): 8.2°C." should be --DTUFL (264 psi.): 82°C.--

Col. 15, line 18, instead of "Example 2" should be --Example 1--

UNITED STATES PATENT OFFICE
CERTIFICATE OF CORRECTION

Patent No. 3,793,402          Dated 2/19/74

Inventor(s) Frederick H. Owens          - 2 -

It is certified that error appears in the above-identified patent and that said Letters Patent are hereby corrected as shown below:

In the specification make the following changes:

Col. 3, line 44, delete one "of"

Col. 3, line 55, instead of "propoagate" should be --propagate--

Col. 4, line 39, instead of "sals" should be --salts--

Col. 9, line 2, instead of "weight, percent" should be --weight-percent--

Col. 12, line 48, instead of "250/0.06//50/0.1/0.4//24/1" should be --25/0.06//50/0.1/0.4//24/1--

Col. 13, in Table I, instead of "izod" should be --Izod*-- Footnote, instead of "11/14" notched, izod impact strength" should be --*1/4" notched Izod impact strength--

Col. 15, line 34, instead of "30/0.06//40/0.2//10/0/0.1//14/6" should be --30/0.06//40/0.2//10/0.1//14/6--

Col. 17, line 10, instead of "5/0.05//20/0.6//15/5/0.4//20/0.6//0.6//14/5/1" should be --5/0.05//20/0.6//15/5/0.4//20/0.6//14/5/1--

Signed and Sealed this thirtieth Day of December 1975

[SEAL]

Attest:

RUTH C. MASON
Attesting Officer

C. MARSHALL DANN
Commissioner of Patents and Trademarks